US012286814B1

United States Patent
James (10) Patent No.: US 12,286,814 B1
(45) Date of Patent: Apr. 29, 2025

(54) DOOR OPENING SYSTEM FOR ANIMAL ENCLOSURE

(71) Applicant: Lee Hagood James, Seattle, WA (US)

(72) Inventor: Lee Hagood James, Seattle, WA (US)

( * ) Notice: Subject to any disclaimer, the term of this patent is extended or adjusted under 35 U.S.C. 154(b) by 1225 days.

(21) Appl. No.: 17/077,350

(22) Filed: Oct. 22, 2020

Related U.S. Application Data (60) Provisional application No. 62/924,824, filed on Oct. 23, 2019.

(51) Int. Cl.
| | | |
|---|---|---|
| *E05B 47/00* | (2006.01) | |
| *A01K 1/03* | (2006.01) | |
| *E05B 41/00* | (2006.01) | |
| *E05B 65/00* | (2006.01) | |

(52) U.S. Cl.
CPC ............ *E05B 47/0002* (2013.01); *A01K 1/03* (2013.01); *E05B 41/00* (2013.01); *E05B 65/00* (2013.01); *E05B 2047/0076* (2013.01); *E05B 2047/0095* (2013.01); *E05Y 2201/47* (2013.01); *E05Y 2400/66* (2013.01); *E05Y 2400/85* (2013.01); *E05Y 2999/00* (2024.05)

(58) Field of Classification Search
CPC ............ E05B 2047/0095; E05B 41/00; E05B 47/0002; E05B 65/00; E05B 65/007; E05B 65/0007; Y10S 292/25; Y10S 292/29; A01K 1/03; A01K 31/08
See application file for complete search history.

(56) References Cited

U.S. PATENT DOCUMENTS

| | | | | |
|---|---|---|---|---|
| 485,197 | A * | 11/1892 | Jacobs | E04H 17/16 256/29 |
| 559,331 | A * | 4/1896 | Hood | E06B 11/04 49/191 |
| 582,427 | A * | 5/1897 | Keller | E06B 11/04 256/73 |
| 657,211 | A * | 9/1900 | Carleton | E05B 47/0002 292/144 |
| 2,661,557 | A * | 12/1953 | Reymann | E06B 11/02 160/144 |
| 3,913,958 | A * | 10/1975 | Larime | E05C 17/56 292/251.5 |
| 4,056,277 | A * | 11/1977 | Gamus | E05B 47/0047 292/346 |
| 4,658,543 | A * | 4/1987 | Carr | B61L 29/04 49/192 |
| 4,669,766 | A * | 6/1987 | Hanchett, Jr | E05C 17/56 403/90 |

(Continued)

*Primary Examiner* — Christine M Mills
*Assistant Examiner* — Faria F Ahmad
(74) *Attorney, Agent, or Firm* — Maynard Nexsen PC; Brian T. Sattizahn (57) ABSTRACT

A door opening system for an animal enclosure is provided. The door opening system can include a latch mechanism to hold a door of the animal enclosure in a closed position and an opening mechanism to move the door to an open position in response to the latch mechanism releasing the hold on the door. The latch mechanism can incorporate an electromagnetic locking mechanism that is controlled by a user interface device at the enclosure or by a command from a remote device wirelessly connected to a control module for the electromagnetic locking mechanism by a network. The opening mechanism can include one or more springs that can move the door from the closed position to the open position.

8 Claims, 9 Drawing Sheets

(56) References Cited

U.S. PATENT DOCUMENTS

| | | | | |
|---|---|---|---|---|
| 4,696,500 | A | * | 9/1987 | Zunkel ............... E05C 17/56 292/DIG. 60 |
| 4,852,919 | A | * | 8/1989 | Nimee ............... E05C 17/56 292/DIG. 60 |
| 5,107,714 | A | * | 4/1992 | Lamaignere ........ G05G 17/00 74/100.2 |
| 5,429,399 | A | * | 7/1995 | Geringer ............ E05B 45/06 292/DIG. 65 |
| 5,438,799 | A | * | 8/1995 | Le Faucheur ....... E01F 13/085 49/338 |
| 5,440,838 | A | * | 8/1995 | Lesser ............... E01F 13/06 49/340 |
| 6,053,546 | A | * | 4/2000 | Frolov .............. E05C 19/166 292/144 |
| 6,525,644 | B1 | * | 2/2003 | Stillwagon ........ G07C 9/00309 340/5.9 |
| 6,609,738 | B1 | * | 8/2003 | Roth ............... E05B 65/108 292/144 |
| 6,634,684 | B2 | * | 10/2003 | Spiessl ............. D06F 37/42 68/12.26 |
| 6,867,685 | B1 | * | 3/2005 | Stillwagon ......... E05B 5/003 292/341.16 |
| 6,928,694 | B2 | * | 8/2005 | Breed .............. E05C 17/203 16/82 |
| 7,000,673 | B2 | * | 2/2006 | Cook ............... E06B 11/02 49/501 |
| 7,464,570 | B1 | * | 12/2008 | Chen ............... G07C 9/00912 109/59 R |
| 8,820,803 | B2 | * | 9/2014 | Hunt ............... E05B 65/108 292/DIG. 65 |
| 11,261,663 | B2 | * | 3/2022 | Klimek ............. E05B 65/0007 |
| 11,885,153 | B2 | * | 1/2024 | Liao ............... E05B 47/0002 |
| 2002/0066295 | A1 | * | 6/2002 | Jacobs ............. B60R 25/02128 70/186 |
| 2004/0026933 | A1 | * | 2/2004 | Smith .............. E05C 19/166 292/251.5 |
| 2004/0041414 | A1 | * | 3/2004 | Mandall ............ E05C 19/166 292/251.5 |
| 2004/0069028 | A1 | * | 4/2004 | Dimig ............. E05B 83/36 70/277 |
| 2006/0220391 | A1 | * | 10/2006 | Baragano Gonzalez ............... E05B 55/12 292/194 |
| 2007/0096477 | A1 | * | 5/2007 | Hirunuma ........ E05B 47/0002 292/150 |
| 2007/0144880 | A1 | * | 6/2007 | Bragg ............. E05B 47/0607 200/50.02 |
| 2008/0143122 | A1 | * | 6/2008 | Peng .............. E05B 47/0002 292/251.5 |
| 2008/0169890 | A1 | * | 7/2008 | Irwin ............. E05B 47/0002 335/228 |
| 2008/0296915 | A1 | * | 12/2008 | Clark ............. E05C 19/163 292/251.5 |
| 2009/0134961 | A1 | * | 5/2009 | Bachle ........... E05B 47/0696 335/177 |
| 2009/0217716 | A1 | * | 9/2009 | Diaz Aranda ..... E05B 47/026 70/266 |
| 2009/0308116 | A1 | * | 12/2009 | Lambrou ......... E05B 47/02 307/104 |
| 2010/0071425 | A1 | * | 3/2010 | Dudley ........... E05B 47/0607 70/277 |
| 2010/0132418 | A1 | * | 6/2010 | Chen ............. E05B 47/026 70/277 |
| 2012/0160179 | A1 | | 6/2012 | Brown et al. |
| 2013/0020815 | A1 | * | 1/2013 | Smith ............ E05C 17/56 292/263 |
| 2014/0159388 | A1 | * | 6/2014 | Liao ............. E05C 19/166 292/251.5 |
| 2016/0366848 | A1 | | 12/2016 | Cantwell et al. |
| 2017/0020106 | A1 | | 1/2017 | Dalzell |
| 2019/0024454 | A1 | * | 1/2019 | Maddamma ...... E05F 15/56 |
| 2019/0186199 | A1 | * | 6/2019 | Klimek .......... E04H 12/2269 |
| 2020/0329665 | A1 | | 10/2020 | Edmonds |
| 2021/0102408 | A1 | * | 4/2021 | Promutico ....... E05B 65/00 |
| 2021/0207432 | A1 | * | 7/2021 | Van Huystee .... E05B 47/026 |
| 2021/0219787 | A1 | * | 7/2021 | Clarke .......... E05B 65/00 |

\* cited by examiner

DOOR OPENING SYSTEM FOR ANIMAL ENCLOSURE

CROSS-REFERENCE TO RELATED APPLICATION

This application claims the benefit of U.S. Provisional Patent Application No. 62/924,824, entitled "Door Opening System for Animal Enclosure," filed on Oct. 23, 2019, which application is hereby expressly incorporated herein by reference in its entirety.

BACKGROUND

The present application generally relates to a door opening system for an animal enclosure.

Many pet owners keep their pets in an animal enclosures (e.g., cages) for a variety of reasons. As an example, when a pet owner is to be away from his or her house for an extended period of time, the pet owner may place his or her pet in an animal enclosure to prevent the pet from causing damage to the owner's house or to reduce the likelihood of the pet being injured. When the pet owner decides to release the pet from the animal enclosure (e.g., upon returning to his or her home), the pet owner typically walks to the location of the enclosure and manual opens the door or gate of the enclosure to release the pet. To simplify the release process, some animal enclosures can be equipped with a latch mechanism that can be remotely controlled by the pet owner. In such embodiments, the pet owner may unlock the animal enclosure at a remote location away from such enclosure. As an example, even though a pet owner is away from home, the pet owner may unlock the animal enclosure to allow the animal exit the enclosure for a variety of reasons, such as to allow the pet to access food or to prevent the pet from being caged for an extended period of time.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to door opening systems for animal enclosures. A door opening system in some embodiments of the disclosure can include a latch mechanism (or other device) to hold a door of the animal enclosure in a closed position and an opening mechanism to move the door to an open position in response to the latch mechanism releasing the door. The latch mechanism can incorporate an electromagnetic locking mechanism that is controlled by a control module. The latch mechanism can be operated by a user interface device at the enclosure or by a command from a remote device wirelessly connected to the control module by a network. The opening mechanism can include one or more spring-loaded devices or other types of devices that can move the door from the closed position to the open position thereby allowing a pet in the enclosure to see that the door is open.

Figure 1:
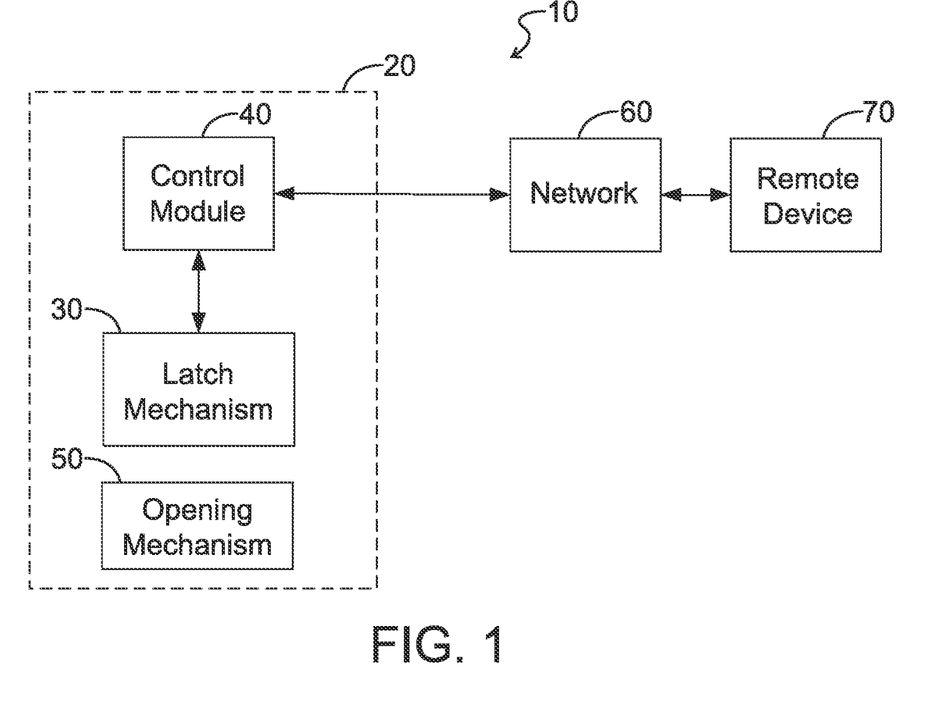
FIG. 1 is a block diagram showing an embodiment of a door opening system for an animal enclosure.
Figure 8:
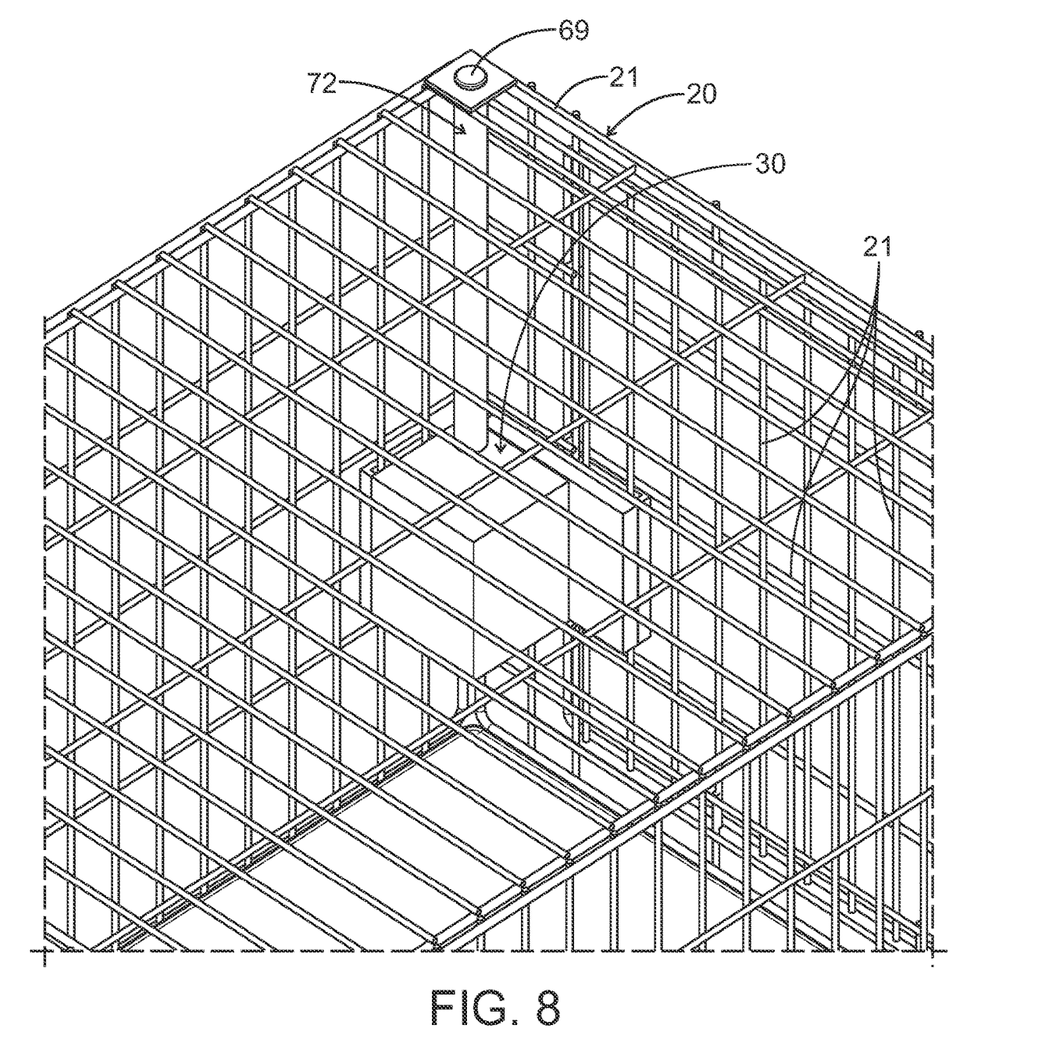
FIG. 8 shows a partial perspective top view of an embodiment of a user interface device of the control module of FIG. 7.
Figure 9A:
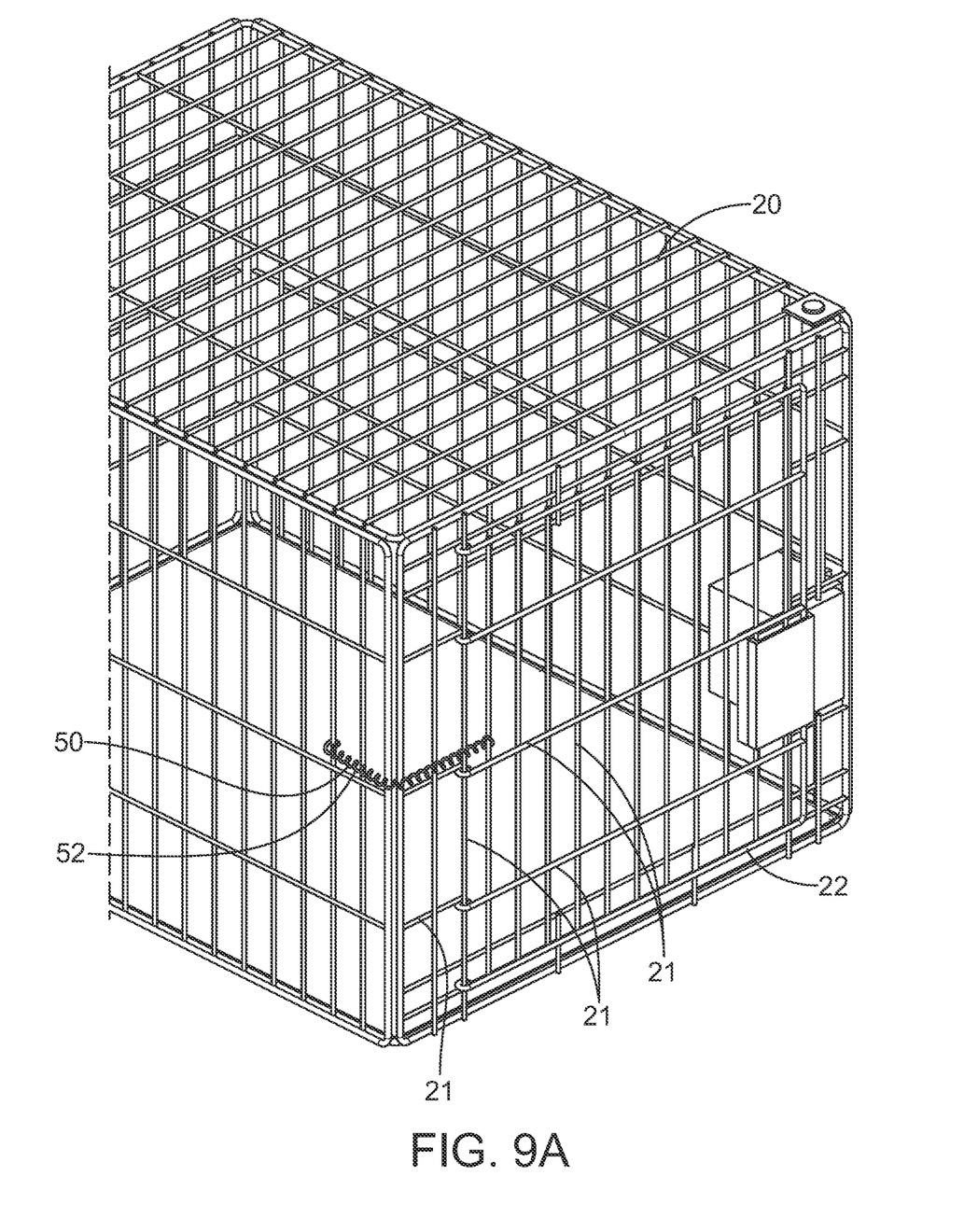
FIGS. 9A and 9B show partial side perspective views of an embodiment of the opening mechanism of FIG. 1.
Figure 9B:
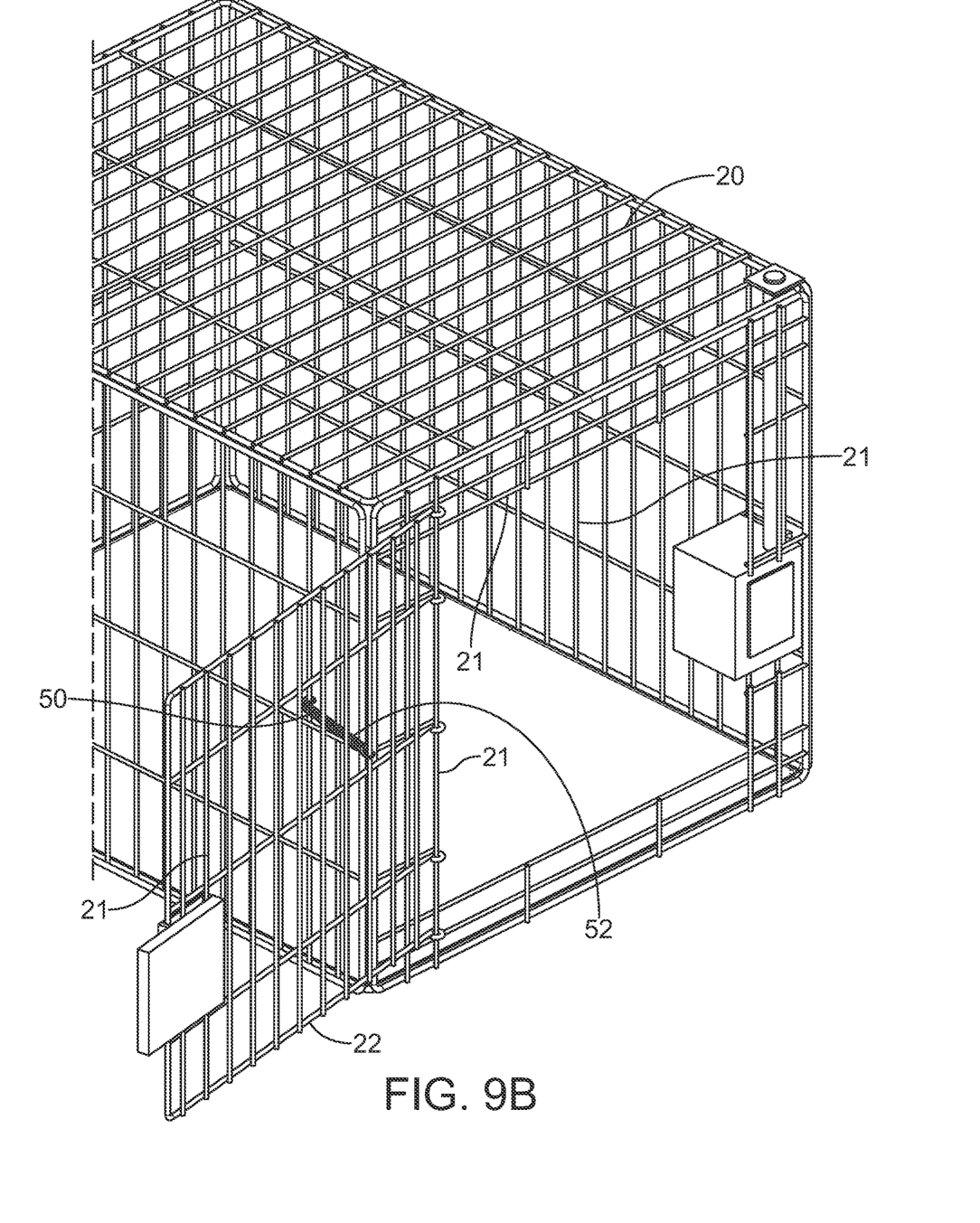

FIG. 1 schematically shows an embodiment of a door opening system 10 for an enclosure. In the embodiment depicted by FIG. 1, the door opening system 10 can be used to open a door (not shown in FIG. 1) for an animal enclosure 20 that can house one or more animals. An exemplary enclosure 20 having a door (or multiple doors) for permitting an animal to enter and exit the enclosure 20 is shown by FIGS. 8, 9A, and 9B. In this regard, the enclosure may be defined by a plurality of bars 21, such as horizontal and vertical bars that intersect to form a cage. As shown by FIGS. 8, 9A, and 9B, there may be spacing between the respective bars 21 so that the inside of the enclosure 20 is viewable. Some of the bars 21 forming the door 22 may be hinged or wrap around other bars so that the door 22 may swing open or closed. In other embodiments, other types of enclosures are possible.

The system 10 can include a latch mechanism 30 (or other suitable device or system to hold a door in the closed position) at least partially mounted on the enclosure 20 such that the latch mechanism 30 can hold the door of the enclosure 20 in a closed position thereby preventing an animal housed in the enclosure 20 from leaving the enclosure 20. The latch mechanism 30 can have an engaged state that can hold the door in the closed position and prevent access to the interior of the enclosure 20 and a disengaged state that does not hold the door and permits the door to move to an open position and allow access to the interior of the enclosure 20 such that an animal housed in the enclosure 20 can exit the enclosure 20.

The system 10 can also include a control module 40 (or control device) electrically coupled to the latch mechanism 30 to control the operation of the latch mechanism 30 between the engaged and disengaged states. In one embodiment, the control module 40 can be incorporated in the latch mechanism 30. However, in other embodiments, the control module 40 (or portions thereof) can be separate components mounted on the enclosure 20 (or in proximity to the enclosure 20) and connected by a wired and/or wireless connection to the latch mechanism 30. In an embodiment, the control module 40 can include a user interface device (not shown in FIG. 1) that a user can manually operate to switch the latch mechanism 30 between the engaged and disengaged states.

In addition, the control module 40 can be connected to a network 60 by a wired or wireless connection to permit the control module 40 to receive control instructions from a remote device 70 to transition the latch mechanism 30 between the engaged and disengaged states. In one embodiment, the network 60 can include any of various types of networks, such as local area networks (LANs), wide area networks (WANs), cellular networks, or the Internet. The remote device 70 can be any suitable device that can communicate with network 60 and process commands from the user relating to transitioning (or switching) the latch mechanism 30 between the engaged and disengaged states. In one embodiment, the remote device 70 can be a smartphone, tablet computer, laptop computer, smart watch, personal computer, voice-controlled smart device, etc.

Figure 2:
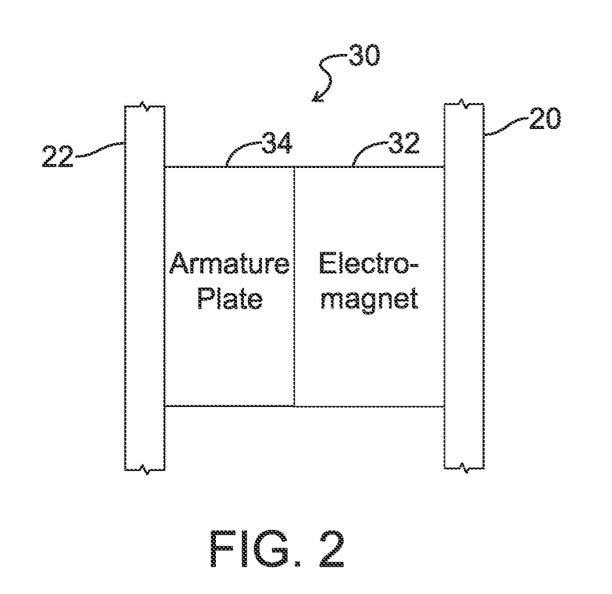
FIG. 2 is a block diagram showing an embodiment of a latch mechanism of FIG. 1.
Figure 3A:
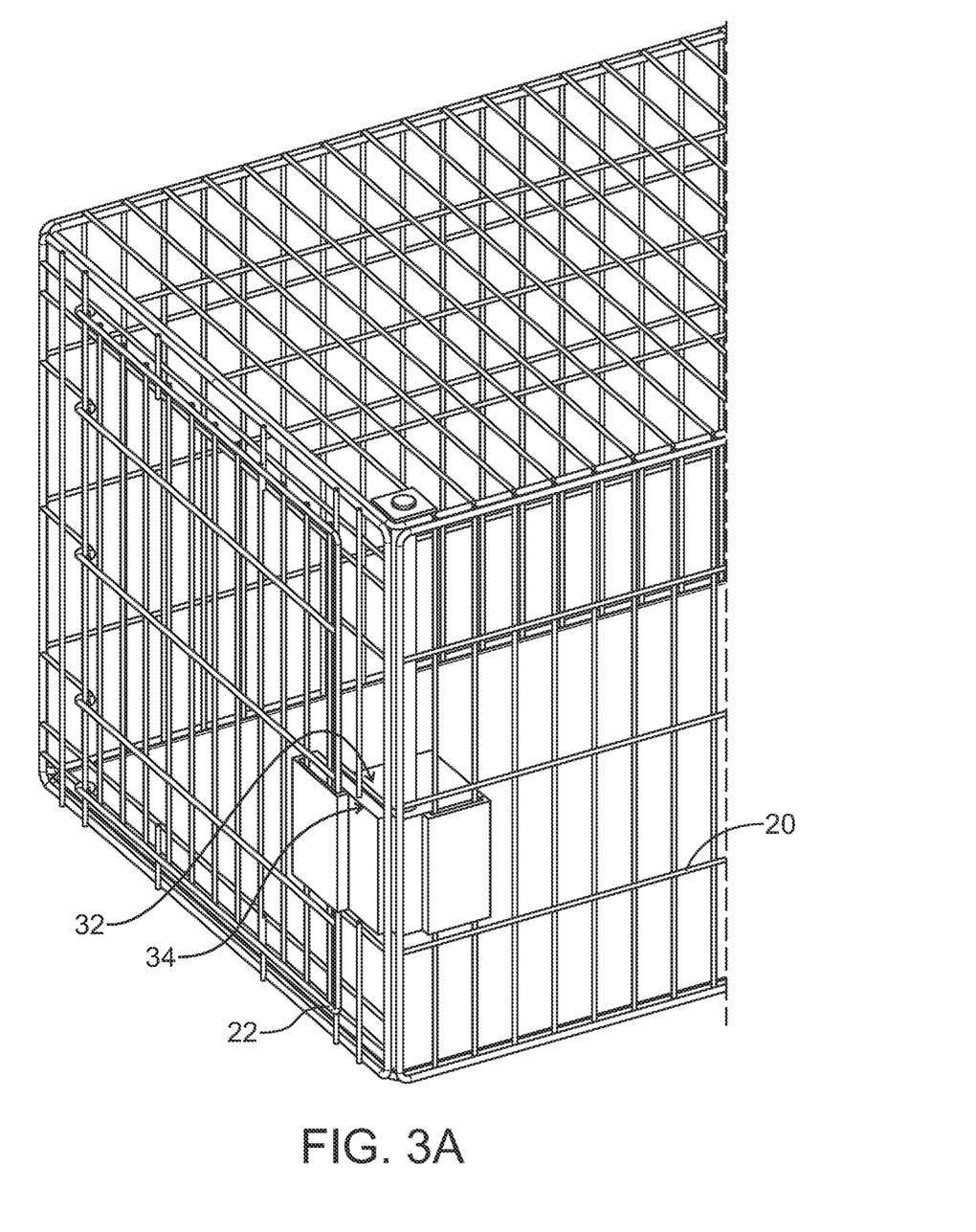
FIGS. 3A and 3B show partial side perspective views of an embodiment of the latch mechanism of FIG. 1.
Figure 3B:
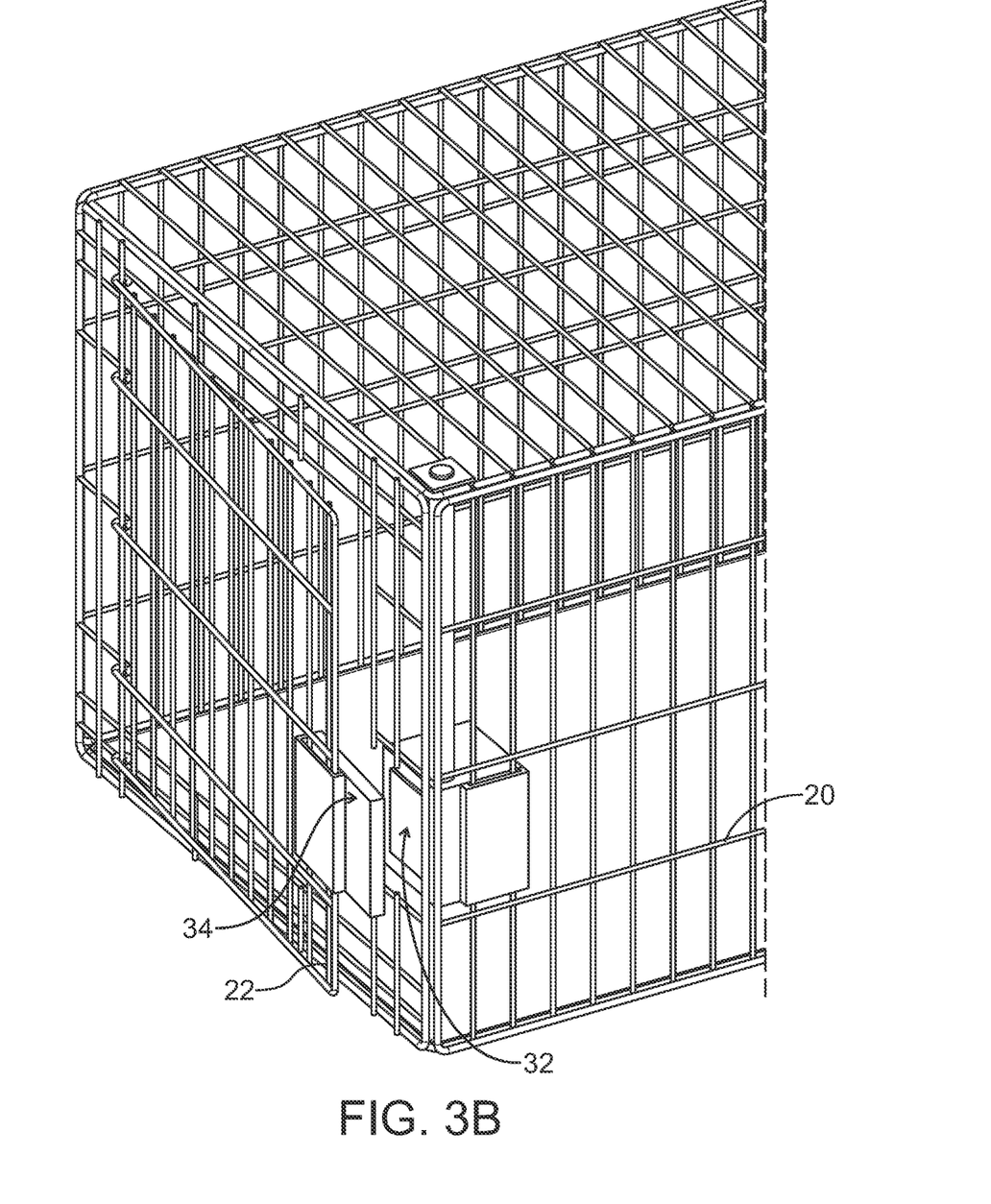

FIGS. 2 and 3A show an embodiment of the latch mechanism 30 in the engaged state, while FIG. 3B shows the latch mechanism 30 in the disengaged state. The latch mechanism 30 can include an electromagnet 32 connected to (or mounted on) the enclosure 20 and an armature plate 34 connected to (or mounted on) a door 22 of the enclosure 20. The armature plate 34 can be any suitable magnetic material, such as a ferrous metal, or any other type of material that interacts with a magnetic field generated by the electromagnet 32. The electromagnet 32 generates a magnetic force that pulls or pushes the armature plate 34. When the latch mechanism 30 is in the engaged state, the control module 40 can provide a current to the electromagnet 32 to energize the electromagnet 32. The current flowing through the electromagnet 32 creates a magnetic flux that results in the armature plate 34 being drawn (or attracted) to the electromagnet 32 and then held in contact with the electromagnet 32 by the magnetic flux for as long as the current is provided to the electromagnet 32. In an embodiment, the electromagnet 32 may incorporate one or more heat sinks or heat dissipation devices to prevent the electromagnet from overheating and possibly injuring the animal in the enclosure 20.

The surface area and thickness of the armature plate 34 and the number of coils and/or the number of windings for each coil in the electromagnet 32, along with the current passing through the coils, can be used to control the strength of the latch mechanism 30 (i.e., how much force is needed to open the door 22 when the latch mechanism 30 is in the engaged state). In one embodiment, the electromagnet 32 and the armature plate 34 of the latch mechanism 30 can be configured to be held together by about 130 pounds of force, but other strengths are possible in other embodiments. In some embodiments, the electromagnet 32 may be mounted on the door 22 and the armature plate 34 may be mounted on the enclosure 20. In still another embodiment, the latch mechanism 30 can include two or more sets of electromagnets 32 and armature plates 34 to hold the door 22 in the closed position when the latch mechanism 30 is in the engaged state. For example, a first electromagnet 32 and armature plate 34 may be located near the top of the door 22, while a second electromagnet 32 and armature plate 34 may be located near the bottom of the door 22.

Figures 4, 5A, 5B, 6:
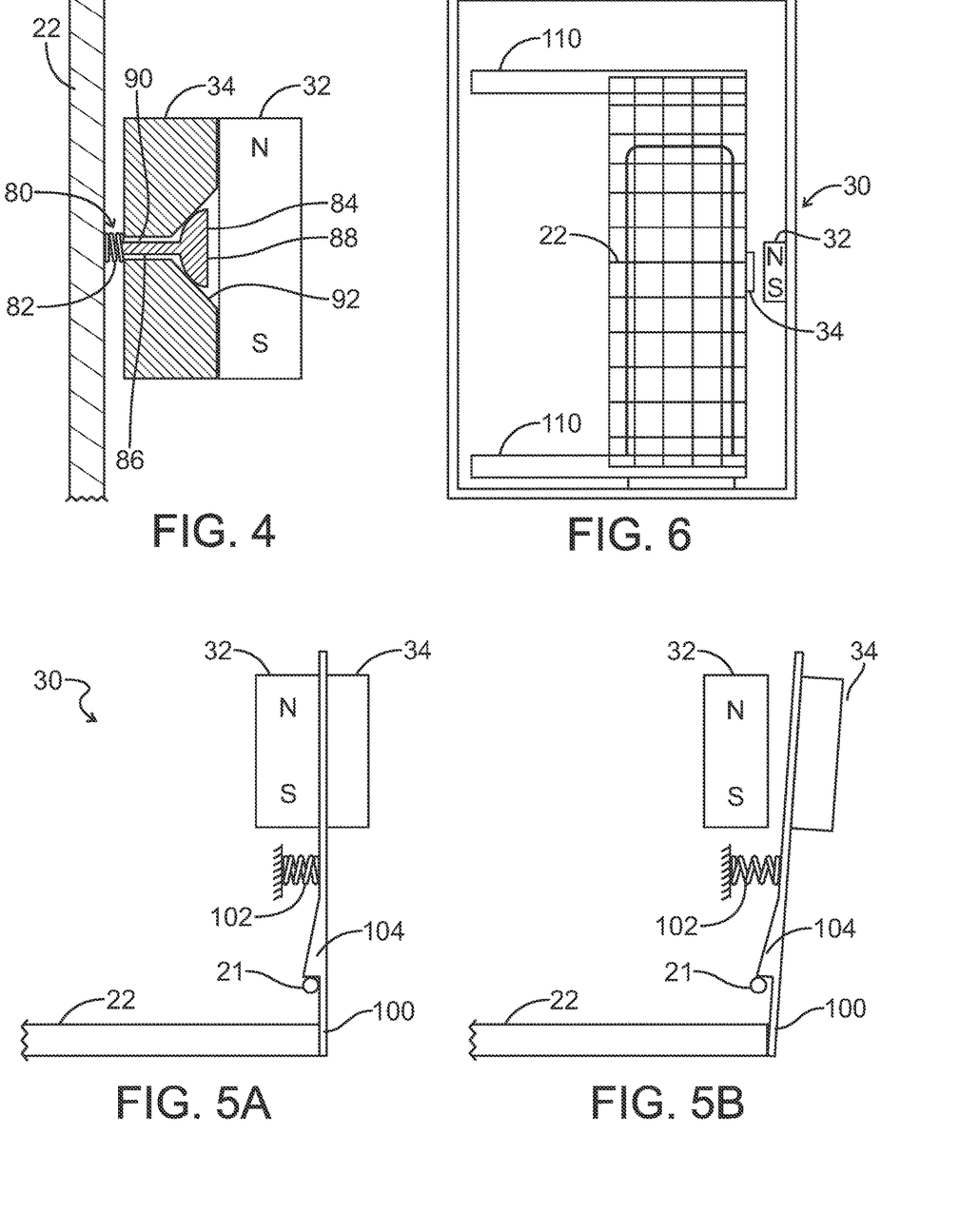
FIG. 4 shows a partial side view of a further embodiment of the latch mechanism of FIG. 1.
FIGS. 5A and 5B show partial top views of another embodiment of the latch mechanism of FIG. 1.
FIG. 6 shows a partial front view of still another embodiment of the latch mechanism of FIG. 1.

FIG. 4 shows another embodiment of latch mechanism 30 in the engaged state. The latch mechanism 30 can operate similar to the latch mechanism 30 of FIG. 2 except that the armature plate 34 is not directly coupled to the door 22. A coupling device 80 can be used to connect the armature plate 34 to the door 22. The coupling device 80 can permit the armature plate 34 to remain stationary even when the door 22 is moved angularly (e.g., pivoted) or rotationally. In other words, the coupling device 80 permits small changes in the angular orientation or rotational position of the door 22 relative to the armature plate 34. The coupling device 80 can be used to dissipate some (or all) of the force that may be applied to the armature plate 34 as a result of the animal in the enclosure 20 applying a force on the door 22 (e.g., the animal pushing on the top portion of the door 22). In one embodiment, the coupling device 80 can be a kinematic coupling or a kinematic mount.

As shown in FIG. 4, the coupling device 80 can be a spring-biased ball joint. The ball joint can include a spring 82 and a bearing stud 84. One end of the spring 82 can be connected to the door 22 and the other end of the spring 82 can be connected to the armature plate 34. As shown by FIG. 4, the spring 82 may spiral around a shaft 86 of the bearing stud 84, and this spring 82 can be used to dampen applied forces on the armature plate 34 resulting from the application of a force on the door 22. In addition, the spring 82 can operate to help reduce (or eliminate) any moment applied to the armature plate 34 by an external force applied to the door 22 (e.g., an animal pushing on the top of the door 22). The spring 82 and the bearing stud 84 can operate to convert a moment from an external force on the door 22 to a force that is substantially perpendicular to the armature plate 34. Thus, in order to separate the armature plate 34 and the electromagnet 32, a force greater than the corresponding force from the magnetic flux of the electromagnet has to be applied to the door 22 as a result of the coupling device 80 converting a moment to a perpendicular force.

The bearing stud 84 can include a shaft 86 and a ball portion 88. The shaft 86 can extend through a passageway 90 in approximately the center (or other location) of the armature plate 34 and, if desired, can be connected to the spring 82. The ball portion 88 can be connected to or otherwise formed on the end of the shaft 86 opposite the spring 82. The ball portion 88 has a rounded shape (e.g., circular or semi-circular) in a tapered cavity 92 in the armature plate 34 such that the ball portion 88 can move (e.g., pivot or rotate) within the cavity 92 to limit the application of rotational forces on the armature plate 34. In one embodiment, the ball portion 88 can have a spherical or hemispherical shape, but other shapes for the ball portion 88 are possible in other embodiments. When the ball portion 88 rotates in the cavity 92, the ball portion 88 may roll on the inner surface of the cavity 92 so that rotation of the ball portion 88 generates no or very little additional force on the armature plate 34.

Since the ball portion 88 is unable to fit through the passageway 90, the presence of the ball portion 88 within the cavity 92 prevents the door 22 from pulling away from the armature plate 34 beyond a maximum separation distance. In this regard, as a force is applied to the door 22 tending to pull the door 22 away from the armature plate 34 and electromagnet 32, such as by the animal in the enclosure 20, the ball portion 88 is pressed against the inner wall of the cavity 92. Further, when the electromagnet 32 is energized such that the armature plate 34 is held against the electromagnet 32 by magnetic a force generated by the electromagnetic 32, the force generated by the ball portion 88 pressing against the inner wall of the cavity 92 tends to resist the force applied to the door 22 that tends to pull the door 22 away from the armature plate 34. Thus, the presence of the ball portion 88 within the cavity 92 prevents the door 22 from moving away from the armature plate 34 beyond a maximum distance. That is, the spring 82 allows a small amount of movement between the door 22 and the armature 34 but not enough to allow the door 22 to open so that the animal can escape the enclosure 20 when then armature plate 34 is pressed against the electromagnet 32 by the magnetic force of the electromagnet 34. Thus, the door 22 is prevented from opening to allow the animal to escape until the electromagnet 32 is de-energized, thereby permitting the armature plate 34 to move away from the electromagnet 32.

The design of the spring-biased ball joint shown by FIG. 4 can help to prevent the door 22 from being opened by the animal for a given latch strength. In this regard, an animal in the enclosure 20 may apply a force on the door 22 in a direction that tends to force the door 22 open, such as by pushing on the door with the animal's nose, paw, or other body part. If the animal applies the force on the door 22 some distance away from the center of the door 22, such as near a top or bottom of the door 22, the force generated by the dog may cause the door 22 to slightly move angularly or, other words, rotate. As an example, the top of the door 22 may be pushed outwardly by the animal so that the top of the door 22 moves outwardly from the enclosure 20 while (1) the bottom of the door 22 moves inwardly due to tensions in the door 22 from the animal's applied force or (2) does not significantly move (such as when inward movement of the door is prevented by the enclosure 20). Angular movement of the door 22 may generate relatively significant moments at the location of the armature plate 34, thereby increasing the likelihood that the force applied by the animal will be sufficient to overcome the electromagnetic force holding the door 22 closed. If the moments become sufficiently great, the door 22 may open from the force applied by the animal.

However, the spring-biased ball joint design shown by FIG. 4 helps to reduce the moments applied at the armature plate 34 by permitting the bearing stud 84 to move relative to the armature plate 34 at least to an extent before significant moments are generated on the armature plate 34. In this regard, as the door 22 is angularly moved relative to the armature plate 34, the shaft 86 is permitted to rotate within the passageway 90 and the ball portion 88 is permitted to rotate in the cavity 92 (e.g., roll against the inner surface of the cavity 92) without the bearing stud 84 applying a significant force to the armature plate 34 due to the angular movement of the door 22. At some point, the bearing stud 84 may be sufficiently rotated such that the shaft 86 contacts and begins applying force to the armature plate 34. However, until such point is reached, the amount of force applied to the armature plate 34 by the bearing stud 84 in response to angular movement of the door 22 is negligible. In some embodiments, it is possible for the ball joint to permit several degrees (e.g., up to about fifteen (15) degrees or more) of angular movement by the door 22 relative to the armature plate 34 without the angular movement generating appreciable forces on the armature plate 34. In other embodiments, other ranges are possible depending on the relative sizes of the shaft 86 and passageway 90 and other factors. Note that the ball joint permits rotation of the door, as described above, about any axis in three dimensions.

In another embodiment, the coupling device 80 can use a metal cable or rope in place of the spring-biased ball joint. One end of the metal cable can be connected to the door 22 and the other end of the metal cable can be connected to the armature plate 34. The end of the metal cable at the armature plate 34 may have crimped swages to permit movement of the metal cable. The flexibility of the metal cable to bend and deform can operate to help reduce (or eliminate) any moment applied to the armature plate 34 by an external force applied to the door 22 (e.g., an animal pushing on the top of the door 22). The metal cable can operate to convert a moment from an external force on the door 22 to a force that is substantially perpendicular to the armature plate 34. Thus, in order to separate the armature plate 34 and the electromagnet 32, a force greater than the corresponding force from the magnetic flux of the electromagnet has to be applied to the door 22 as a result of the coupling device 80 converting a moment to a perpendicular force.

FIG. 5A shows still another embodiment of the latch mechanism 30 in the engaged state, while FIG. 5B shows the latch mechanism 30 in the disengaged state. As shown in FIGS. 5A and 5B, the latch mechanism 30 can be mounted on a side of the enclosure 20 and be positioned substantially perpendicular to the door 22. The electromagnet 32 can be connected to the enclosure 20 and the armature plate 34 can be connected to the door 22 by a coupling device 100. The coupling device 100 can include a wedge portion 104 that can engage with a portion of the enclosure 20 to increase the holding force provided by the latching mechanism 30. In one embodiment, the wedge portion 104 can have a planar surface that extends toward the enclosure and contacts a bar 21 of the enclosure 20 to assist in holding the door 22 in the closed position. The engagement of the wedge portion 104 with the bar 21 (or other portion) of the enclosure 20 increases the amount of force needed to be applied to the door 22 by an animal inside the enclosure 20 to move the door 22 from the closed position to the open position.

When the door 22 is to be opened, the latching mechanism 30 can be transitioned (or switched) to the disengaged state and the engagement of the wedge portion 104 with the enclosure 20 can be released with a spring 102. The spring 102 can be connected to the enclosure 20 and engage with a portion of the coupling device 100. When the latching mechanism 30 is in the engaged state, the force between the armature plate 34 and the electromagnet 32 can tension (e.g., compress) the spring 102 with the coupling device 100. After the latching mechanism 30 is transitioned to the disengaged state, the tension on the spring 102 is released and the force of the spring 102 can deform (e.g., bend or flex) the coupling device 100 (as shown in FIG. 5B) in order to separate the wedge portion 104 from the enclosure 20 (and the electromagnet 32 and the armature plate 34) and permit the door 22 to be moved to the open position.

FIG. 6 shows a further embodiment of latch mechanism 30 in the engaged state. The latch mechanism 30 can operate similar to the latch mechanism 30 of FIG. 2 except that when the latch mechanism 30 is in the disengaged state, a translational movement (e.g., sliding) of the door 22 is needed to move the door 22 to the open position. The top and bottom of the door 22 can be positioned in corresponding channels 110 connected to the enclosure 20. In one embodiment, the opening mechanism 50 (not shown) can be used to move the door 22 to the open position when the latch mechanism 30 is in the disengaged state. For example, the opening mechanism 50 can include springs positioned in channels 110 and connected to the door 22 in order to move the door 22 to the open position.

Figure 7:
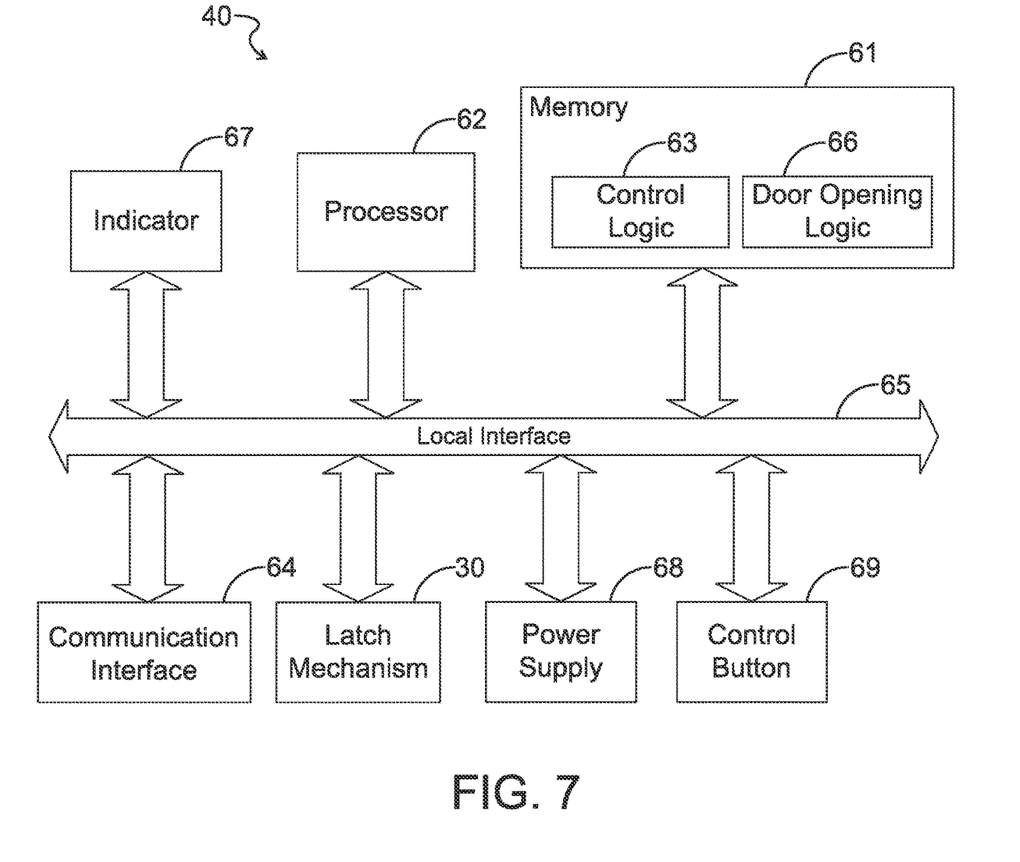
FIG. 7 is a block diagram showing an embodiment of a control module of FIG. 1.

FIG. 7 depicts an embodiment of the control module 40. The control module 40 shown by FIG. 7 can include logic 63, referred to herein as "control logic," for generally controlling the operation of the control module 40. The control module 40 also includes logic 66, referred to herein as "door opening logic," for controlling the latch mechanism 30 connected to the control module 40 and in some embodiments, the opening mechanism 50. In other embodiments, the control logic 63 can be combined with the door opening logic 66. The control logic 63 and the door opening logic 66 may be implemented in software, firmware, hardware, or any combination thereof. In FIG. 7, the control logic 63 and the door opening logic 66 are implemented in software and stored in memory 61. However, other configurations of the control logic 63 and the door opening logic 66 are possible in other embodiments.

Note that the control logic 63 and the door opening logic 66, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus.

The control module 40 may include at least one conventional processor 62, which includes processing hardware for executing instructions stored in the memory 61. As an example, the processor 62 may include a central processing unit (CPU) or a digital signal processor (DSP). The processor 62 communicates to and drives the other elements within the control module 40 via a local interface 65, which can include at least one bus. When the control logic 63 and the door opening logic 66 are implemented in software, the processor 62 may execute instructions of the control logic 63 and the door opening logic 66 to perform the functions ascribed to the control logic 63 and door opening logic 66 herein.

The control module 40 also has a communication interface 64. The communication interface 64 includes a radio frequency (RF) radio or other device for communicating wirelessly. Using the communication interface 64, the control module 40 may communicate with remote devices 70. In addition, the control module 40 may incorporate one or more heat sinks or heat dissipation devices to prevent the control module 40 from overheating and possibly injuring the animal in the enclosure 20.

The control module 40 can have a power supply 68, which provides electrical power to the components of the control module 40 and possibly to the electromagnet 32 of latch mechanism 30 in an embodiment. In one embodiment, the power supply 68 has an interface that allows it to plug into or otherwise interface with an external component, such as a wall outlet or battery, and receive electrical power from such external component. If desired, the power supply 68 may incorporate one or more batteries to permit the control module 40 to be independent of the external power component.

The control module 40 can also have a user interface device 69 (e.g., a control button, control knob or dial, control lever or switch, touchscreen interface, etc.) that is either incorporated in the control module 40 or connected to the enclosure 20 and wired to the control module 40. The user interface device 69 can permit a user at the enclosure 20 to transition the latch mechanism 30 to the disengaged state to permit the door 22 to be moved to the open position. As shown in FIG. 8, the user interface device 69 can be mounted on the top of the enclosure 20. An enclosed (or substantially enclosed) passageway 72 can be positioned between the user interface device 69 and the latch mechanism 30 to permit wires to travel between the user interface device 69 and the latch mechanism 30 regardless of whether the control module 40 is located with the user interface device 69 or with the latch mechanism 30. In one embodiment, the passageway 72 can include additional protective measures (e.g., padding) to prevent the animal in the enclosure 20 from becoming injured and to prevent the animal from damaging the wires (or other components) between the user interface device 69 and the latch mechanism 30. In another embodiment, the passageway 72 can extend for about 2 inches between the user interface device 69 and the control module 40. However, the passageway 72 can have lengths longer or shorter than 2 inches in other embodiments.

The control module 40 can include an indicator 67 that is either incorporated in the control module 40, connected to the enclosure 20 and wired to the control module 40, or in wireless communication with the control module 40. The indicator 67 can provide an audible (e.g., a sound), visible (e.g., a light) or other sensory (e.g., vibration) indication to an animal in the enclosure 20 that informs the animal that the latch mechanism 30 has entered the disengaged state. In another embodiment, the indicator 67 can provide separate indications for the engaged state (e.g., a first light such as a red light) and the disengaged state (e.g., a second light such as a green light). The animal can be trained to move the door 22 to the open position to permit the animal to leave the enclosure 20 after an indication has been provided by the indicator 67 or a change in the indication provided by the indicator 67 has occurred (e.g., a red light changing to a green light) thereby notifying the animal that the latch mechanism 30 is in the disengaged state. In one embodiment, the indicator 67 can be a speaker, a light source (e.g., a light emitting diode) or other suitable device to provide an indication that is discernible by the animal in the enclosure 20. In an embodiment, the door opening logic 66 can activate the indicator 67 simultaneously or substantially simultaneously with the command to transition the latch mechanism 30 to the disengaged state.

In one embodiment, door opening logic 66 can control the providing of power to the electromagnet 32 of the latch mechanism 30 regardless of whether the power is from power supply 68 or another separate power supply connected to the electromagnet 32. For example, the door opening logic 66 can provide instructions to open (or close) a switch to remove current from the electromagnet 32. The removal of current from the electromagnet 32 can de-energize the electromagnet and thereby place the latch mechanism in the disengaged state since there is no (or almost no) magnetic flux to hold the armature plate 34 against the electromagnet 32. The door opening logic 66 can remove power (or current) to the electromagnet 32 in response to the activation of the user interface device 69 or in response to receiving a command from the remote device 70 via network 60. In addition, the door opening logic 66 can also automatically return power (or current) to the electromagnet 32 after the passage of a predetermined time period (e.g., 3 seconds) from when the power (or current) was removed from the electromagnet 32. In another embodiment, the door opening logic 66 can provide power (or current) to the electromagnet 32 in response to a second activation of the user interface device 69 or a second command from the remote device 70.

In an embodiment, the door opening logic 66 can be used to control the opening mechanism 50 or components associated with the opening mechanism 50. For example, the door opening logic 66 can activate the indicator 67 (e.g., a light, speaker, etc.) that can serve as a notification to the animal in the enclosure 20 that the latch mechanism 30 is in the disengaged state and that the door 22 can be moved to the open position. The animal may be trained to push on the door 22 to move the door 22 to the open position in response to the notification provided by the indicator 67. In another embodiment, if the opening mechanism 50 incorporates a powered device (e.g., an actuator), the door opening logic 66 can be used to control the power provided to the opening mechanism 50.

FIG. 9A shows an embodiment of the opening mechanism 50 with the door 22 in a closed (or substantially closed) position, while FIG. 9B shows the opening mechanism 50 with the door 22 in an open position. In the embodiment of FIGS. 9A and 9B, the opening mechanism 50 can include a spring 52 having one end connected to the enclosure 20 and an opposed end connected to the door 22. As shown in FIG. 9A, the spring 52 can be tensioned (e.g., extended) when the door 22 is in the closed position and the latch mechanism 30 is in the engaged state. When the latch mechanism 30 is switched to the disengaged state, the tension on the spring 52 is released and the contraction of the spring 52 can move (e.g., pull) the door 22 to the open position as shown in FIG. 9B. In another embodiment, the opening mechanism 50 can include more than one spring 52. The additional springs 52 may be connected to different areas of the enclosure 20 or door 22 to provide opening forces in different locations of the door 22 (e.g., the top and bottom of the door 22). Alternatively, several springs 52 may be connected in the same area of the enclosure 20 or door 22 to increase the opening force provide by the spring 52.

Figure 10A:
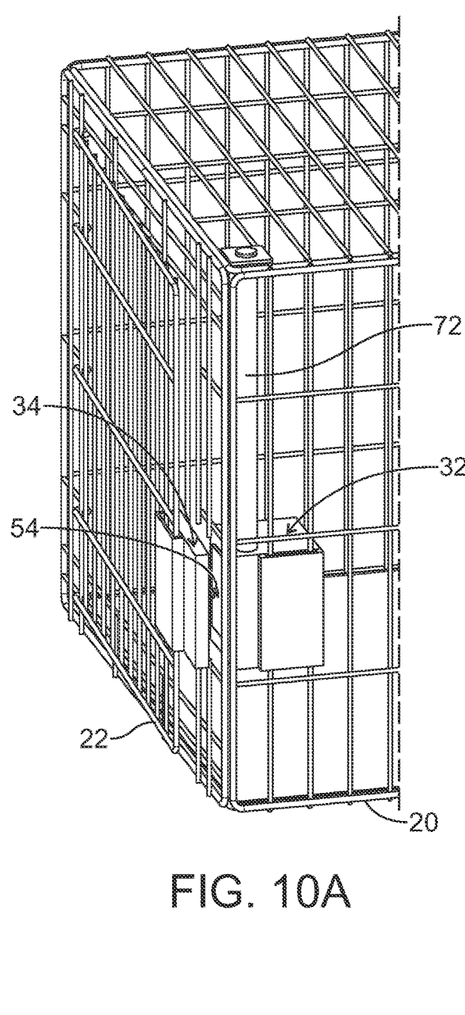
FIGS. 10A and 10B show partial perspective views of another embodiment of the opening mechanism of FIG. 1.
Figure 10B:
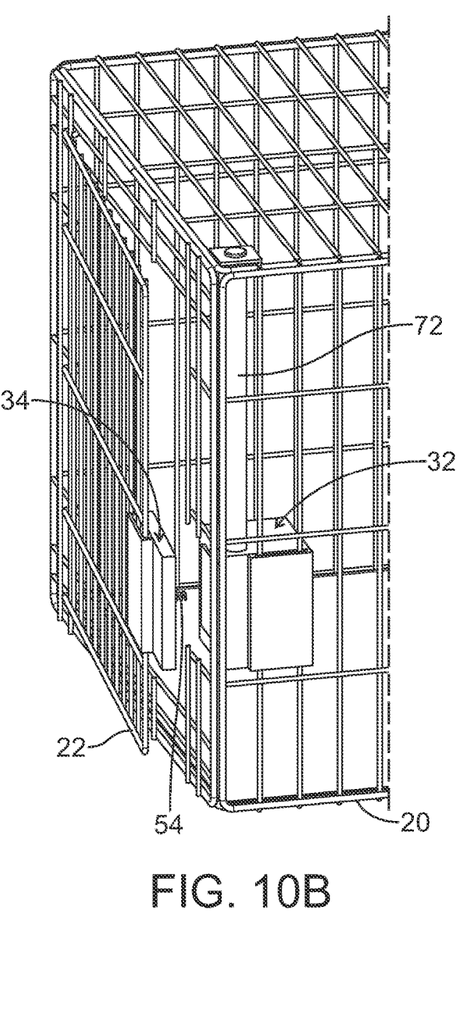

FIG. 10A shows an embodiment of the opening mechanism 50 with the door 22 in an open, but almost closed position, while FIG. 10B shows the opening mechanism 50 with the door 22 in an open position. In the embodiment of FIGS. 10A and 10B, the opening mechanism 50 can include a spring 54 having one end connected to the armature plate 34 and an opposed end in contact with the electromagnet 32 when the door 22 is in the closed position. The spring 54 may be positioned in a cavity of the armature plate 34 such that when the spring 54 is tensioned (e.g., compressed), the tensioned spring 54 may reside in the cavity while the armature plate 34 is in contact with the electromagnet 32 upon the latch mechanism 30 being in the engaged state. In another embodiment, the spring 54 may be attached to the electromagnet 32 and reside in a cavity in the electromagnet 32 and/or armature plate 34, and engage the armature plate 34 upon the latch mechanism 30 being in the engaged state. As shown in FIG. 10A, the spring 54 can be tensioned when the door 22 is in the closed position and the latch mechanism 30 is in the engaged state. When the latch mechanism 30 is switched to the disengaged state, the tension on the spring 54 is released and the expansion of the spring 54 can move (e.g., push) the door 22 to the open position as shown in FIG. 10B. In another embodiment, the opening mechanism 50 can include more than one spring 54. The additional springs 54 may be connected to different areas of the armature plate 34 to provide opening forces in different locations. In another embodiment, the opening mechanism 50 may incorporate both spring 52 and spring 54.

In an embodiment, the opening mechanism 50 may also incorporate the electromagnet 32. The door opening logic 66 of the control module 40 may include instructions to reverse the current to the electromagnet 32 when the latch mechanism is transitioned to the disengaged state such that the electromagnet 32 can provide a repelling force (in place of an attraction force) toward the armature plate 34 in order to move the armature plate 34 (and the door 22) away from the electromagnet 32.

Another embodiment is directed to an enclosure securing apparatus that can include a locking mechanism, an opening mechanism and a control device. The locking mechanism can be mechanically coupled adjacent to both the enclosure and/or the door. The opening mechanism can be mechanically coupled adjacent to both the enclosure and/or the door. The control device is configured such that an operator can configure the state of the locking mechanism and/or the opening mechanism. The locking mechanism may also include an electromagnet that is electrically coupled to the control device and is kinematically coupled to the enclosure and/or the door. The locking mechanism may also include an armature that is kinematically coupled to the enclosure and/or the door. The armature is adjacent to the electromagnet when the door is in the locked state. The locking mechanism may also include a second electromagnet that is electrically coupled to the control device and is kinematically coupled to the enclosure and/or the door. The second electromagnet can be adjacent to the first electromagnet when the door is in the locked state. The opening mechanism may include an elastically deformable connection. The opening mechanism may also include a method of reversing the direction of current in the electromagnet of the latch mechanism. In a further embodiment some or all of the components of the locking mechanism are kinematically coupled to the enclosure and/the door. In an embodiment, the kinematic coupling between some or all of the components of the locking mechanism include a means of allowing angular motion in one, and/or two, and/or three directions. In a further embodiment, there can be a plurality of locking mechanisms.

Yet another embodiment is directed to an enclosure securing apparatus. The enclosure securing apparatus can include a control device and a magnetic lock configured for resisting the door of the enclosure from opening. The lock can include an electromagnet configured to be mounted on the enclosure and/or the door and an armature configured to be mounted on the enclosure and/or the door. The apparatus can also include a ferrous metal mechanically coupled to the enclosure and/or the door and a biasing mechanism to act on said armature and/or electromagnet. The biasing member can allow for kinematic motion of said armature and/or electromagnet in the form of rotation about all 3 axes. The apparatus may also include a spring to open the door, a state-indicator or a state-change-indicator. The apparatus may further include a kinematic coupling between the ferrous metal and the enclosure and/or the door. The kinematic coupling allows kinematic movement between the ferrous metal and the enclosure and/or the door.

In still another embodiment, the system can include a powered locking mechanism to retain the door when in a locked state, to open the door when in an unlock state, to lightly hold the door when in lightly hold state. The powered locking mechanism may also have an unpowered state. The powered locking mechanism can include an electromagnet to create a magnetic field when energized. The electromagnet can be turned off and can default to an energized state, so when the electromagnet is de-energized, the de-energized state can be temporary (<3 seconds) before returning to the energized state. The powered locking mechanism can include an armature or ferrous metal to apply a force on the door and/or enclosure when the magnetic field is present. The armature should come into contact with electromagnet in the door-closed state. The powered locking mechanism can include a kinematic coupling to increase the force needed to overpower the electromagnet and open the door. The kinematic coupling can be configured to allow for rotation, such as a ball joint, of the armature and/or electromagnet as the enclosure and/or door deform in the case of an opening force while the system is in a locked state. The kinematic coupling can be roughly centered to the armature and/or electromagnet and reduce the lever-action caused by a force and a deforming door. The power locking mechanism can also include a state indicator (e.g., a light) to indicate a state of the locking mechanism to enclosure inhabitants.

The system can also include an opening mechanism to open the door. The opening mechanism can use a spring force to open the door or a current reversal in the electromagnet that allows magnetic hysteresis to be overcome, and the door to be opened without force from the enclosed animal. The opening mechanism is used since there must be some force applied to overcome the non-zero residual magnetic field after the electromagnet is de-energized. The system can also include appropriate shielding and/or other protections for exposed components to prevent the enclosed animals from getting injured (e.g., shocked). The system can also include a control device such as a button to instantaneously open the enclosure and a heat sink or heat dissipation device to prevent injury to the animal from the overheating of components.

A further embodiment of the present application is directed to an animal enclosure. The animal enclosure can include a control device having a fully powered state, an unpowered state, and one or more intermediate power states. The control device can control the power to the electromagnet based on the fully powered state, the unpowered state, and the intermediate states. The animal enclosure can also include an electromagnet to provide a magnetic field and a spring mechanically coupled to the enclosure and/or the electromagnet and/or the door. The spring applies a force on the door to open the door. In another embodiment, the electrical connection between the control device and the electromagnet is mechanically coupled to the enclosure so that the distance between the electrical connection and nearest portion of the enclosure is no more than 2 inches at any point that the electrical connection is within the enclosure.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A door opening system for an animal enclosure, the system comprising:
   a latch mechanism mounted on the animal enclosure, the latch mechanism having an engaged state and a disengaged state, the latch mechanism configured to hold a door of the animal enclosure in a closed position upon being in the engaged state, wherein the latch mechanism comprises an electromagnet and an armature plate, wherein the armature plate is connected to the door by a coupling device and interacts with a magnetic field generated by the electromagnet to place the latch mechanism in the engaged state, the latch mechanism being located on a side of the animal enclosure and the coupling device comprises a wedge portion configured to engage a portion of the animal enclosure when the latch mechanism is in the engaged state and the coupling device further comprises a spring mechanism to disengage the wedge portion and the portion of the animal enclosure when the latch mechanism is in the disengaged state;
   a control module coupled to the latch mechanism, the control module configured to transition the latch mechanism between the engaged state and the disengaged state, wherein the control module controls current to the electromagnet to transition the latch mechanism between the engaged state and the disengaged state; and
   an opening mechanism configured to rotate the door of the animal enclosure from the closed position to an open position in response to the latch mechanism transitioning from the engaged state to the disengaged state.

2. A door opening system for an animal enclosure, the system comprising:
   a latch mechanism mounted on the animal enclosure, the latch mechanism having an engaged state and a disengaged state, the latch mechanism configured to hold a door of the animal enclosure in a closed position upon being in the engaged state, wherein the latch mechanism comprises an electromagnet and an armature plate, wherein the armature plate is connected to the door by a coupling device and interacts with a magnetic field generated by the electromagnet to place the latch mechanism in the engaged state;
   a control module coupled to the latch mechanism, the control module configured to transition the latch mechanism between the engaged state and the disengaged state, wherein the control module controls current to the electromagnet to transition the latch mechanism between the engaged state and the disengaged state;
   an opening mechanism configured to rotate the door of the animal enclosure from the closed position to an open position in response to the latch mechanism transitioning from the engaged state to the disengaged state; and
   the coupling device comprises a metal cable having one end connected to the door and an opposed end connected to the armature plate.

3. The door opening system of claim 1, further comprising a remote device operated by a user, the remote device configured to provide, via a network, control instructions to the control module to transition the latch mechanism.

4. The door opening system of claim 1, further comprising an indicator in communication with the control module and configured to provide an indication of whether the latch mechanism is in the engaged state.

5. The door opening system of claim 4, wherein the indication provided by the indicator is one or more of an audible indication, a visible indication or a sensory indication.

6. The door opening system of claim 1, further comprising a user interface device located in proximity to the animal enclosure, wherein operation of the user interface device by a user provides a control instruction to the control module to transition the latch mechanism.

7. The door opening system of claim 1, wherein the opening mechanism comprises at least one spring and the at least one spring is configured to rotate the door from the closed position to the open position.

8. A door opening system for an animal enclosure, the system comprising:
   a latch mechanism mounted on an animal enclosure, the latch mechanism having an engaged state and a disengaged state, the latch mechanism configured to hold a door of the animal enclosure in a closed position upon being in the engaged state;

a control module coupled to the latch mechanism, the control module configured to transition the latch mechanism between the engaged state and the disengaged state;

an opening mechanism configured to move the door of the animal enclosure from the closed position to an open position in response to the latch mechanism transitioning from the engaged state to the disengaged state, the opening mechanism comprising at least one spring;

the latch mechanism comprising an electromagnet and an armature plate, wherein the armature plate interacts with a magnetic field generated by the electromagnet to place the latch mechanism in the engaged state, and wherein the control module controls current to the electromagnet to transition the latch mechanism between the engaged state and the disengaged state; and the at least one spring being located in a cavity in at least one of the electromagnet or the armature plate.

* * * * *